Aug. 19, 1958 M. P. BAKER 2,847,837
FLUID SEAL
Filed May 10, 1955
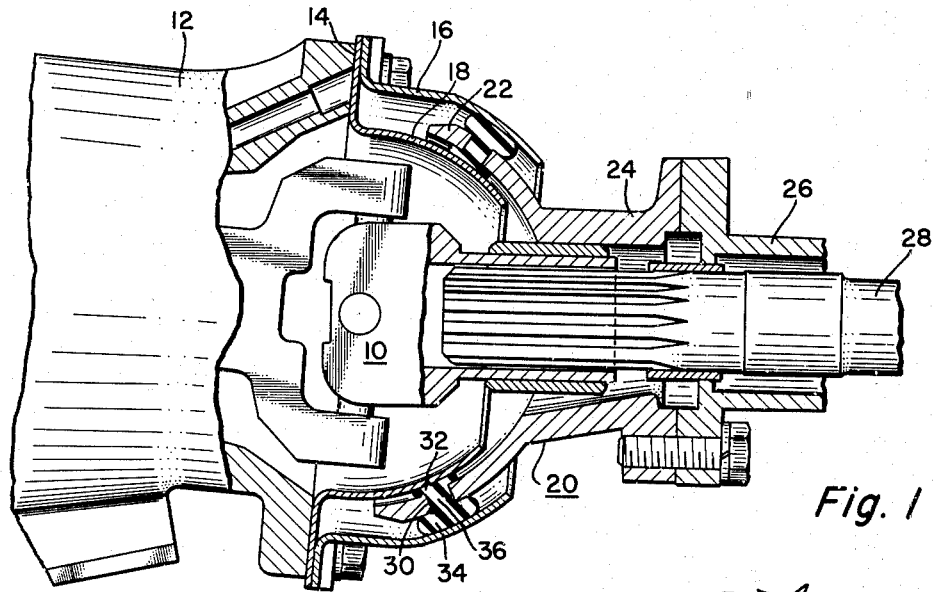
Fig. 1
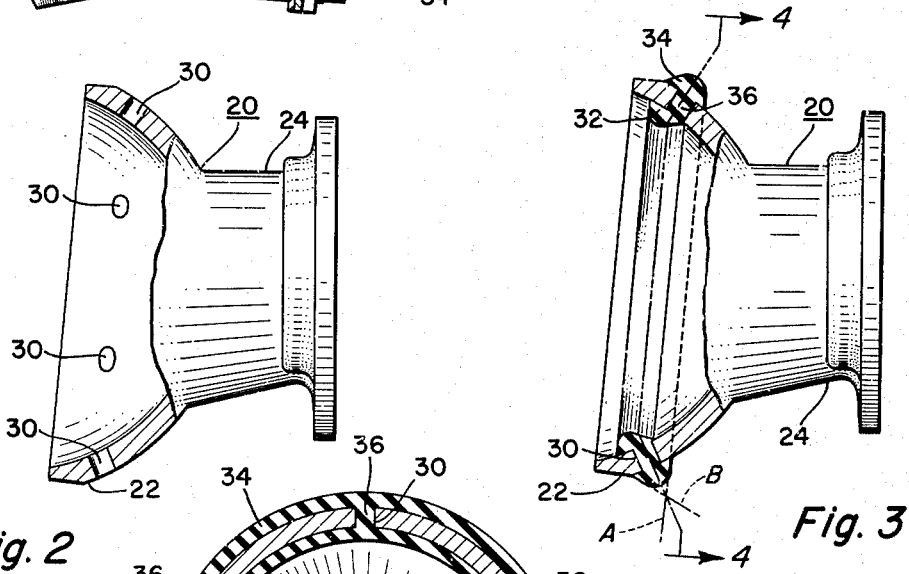
Fig. 2
Fig. 3
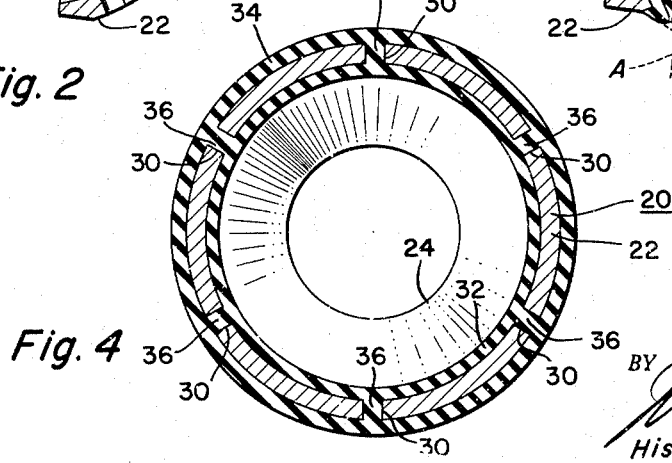
Fig. 4
INVENTOR.
Max P. Baker
BY
His Attorney

United States Patent Office 2,847,837
Patented Aug. 19, 1958

2,847,837

FLUID SEAL

Max P. Baker, Dayton, Ohio, assignor to General Motors Corporation, Detroit, Mich., a corporation of Delaware Application May 10, 1955, Serial No. 507,435

10 Claims. (Cl. 64—32)

This invention relates to fluid seals and particularly to seals for use in universal joints.

It is an object of this invention to provide a molded elastomeric seal member which consists of two annuli held in spaced relation by a plurality of separated and integral spacing elements.

It is another object of this invention to provide a seal adapted to be interposed between concentric inner and outer curvilinear surfaces and a third concentric curvilinear member interposed between the inner and outer surfaces: the seal consisting of an integral elastomeric structure comprising inner and outer curvilinear portions joined by a plurality of separated spacing elements wherein the inner and outer curvilinear portions are adapted to be carried by inner and outer surfaces, respectively, of the third concentric curvilinear member.

It is a further object of this invention to provide a universal joint member adapted to be movably and sealingly interposed between spaced concentric inner and outer partially spherical members which consists of a partially spherical shell having a plurality of spaced circumferentially disposed openings and an integral seal having inner and outer annuli carried on inner and outer sides of the shell, in alignment with the openings, and a plurality of connecting portions projecting through the openings and joining the annuli.

It is another object of this invention to provide a universal joint which includes inner and outer partially spherical members in spaced relation and a third partially spherical member interposed therebetween in spaced relation wherein the third member has a plurality of spaced circumferentially disposed openings and elastomeric seal rings molded onto inner and outer surfaces of the third member in circumferential alignment with the openings whereby the rings are integrally joined through the openings and wherein the seal rings are under compression between the third seal carrying member and the inner and outer members.

Further objects and advantages of the present invention will be apparent from the following description, reference being had to the accompanying drawings wherein preferred embodiments of the present invention are clearly shown.

In the drawings:

Figure 1 is a fragmentary view in partial cross section of a universal joint housing and embodying the present invention.

Figure 2 is a side view in partial cross section of a partially spherical universal joint member which may be used with the seal of the present invention.

Figure 3 is the joint member shown in Figure 2 having incorporated therewith a seal in accordance with the present invention.

Figure 4 is a cross sectional view of the joint member and seal of Figure 3 taken along line 4—4.

Referring to the drawings, Figure 1 shows an embodiment of the present invention wherein a universal joint 10 is encased by a housing capable of universal movement which constitutes a portion of a shaft tube. The housing or casing includes a housing member 12 having an annular face 14 to which is attached concentric partially spherical members 16 and 18 at their enlarged flanged ends. A partially spherical shell or ball 20 has its large diameter portion 22 movably interposed in spaced relation between partially spherical members 16 and 18 and a flanged portion 24 at its narrowed end attached to a flanged portion of shaft tube 26. It is seen that the shaft tube 26 and shell 20 is not movable horizontally or vertically with respect to the shaft 28 of universal joint 10 but that shell 20 is capable of universal movement between partially spherical members 16 and 18 so as to permit shell 20 to follow the universal movement of joint 10.

The present invention is particularly concerned with providing a fluid seal for parts capable of universal movement as is illustrated by partially spherical members 16 and 18 and shell 20. To this end, as shown in Figure 2, shell 20 is provided with a plurality of circumferentially disposed openings 30 and, as shown in Figures 3 and 4, a continuous inner seal ring 32 and outer seal ring 34 of suitable elastomeric material is preferably molded to the inner and outer faces, respectively, of shell 20 in alignment with the circumferentially disposed openings 30. The elastomeric moldable material flows through the openings 30 to provide a seal structure consisting of an inner seal ring 32 and an outer seal ring 34 integrally joined together by connecting portion 36 which is carried by and bonded to seal 20.

As shown in Figure 3, seal ring portions 32 and 34 are preferably formed with a generally symmetrical conical or mound shape and the tops or high points thereof disposed along a radius of the partially spherical shell 20. In the embodiment shown in Figure 1, which is a universal joint housing arrangement for a universal joint associated with an automobile shaft, the rings 32 and 34 are preferably formed so that the angle between lines A and B drawn parallel to the sides of the rings is approximately 60° as shown in Figure 3. As shown in Figure 1, the seal ring portions 32 and 34, when installed in the universal joint housing assembly, are compressed between the seal carrying members 20 and partially spherical portions 16 and 18. The seal ring portions 32 and 34 are thus flattened out to have a uniform spread on each side of a radial line of the shell 20 and provide an effective seal and a smooth sealing engagement with the cooperating members 16 and 18 during operation of the universal joint whereby the seal may roll and/or slide during operation.

In the preferred form of the invention as described above, the seal member is molded and bonded directly to the shell carrying member 20. However, it is obvious that, for example, the shell member 20 may be provided with slotted openings and the seal member may be molded separately and subsequently fitted to the shell 20 in an obvious manner to form a satisfactory seal arrangement for some purposes. Moreover, the present invention may be applied to cylindrical surfaces and other curvilinear surfaces other than cylindrical or spherical surfaces.

The elastomeric material referred to may be natural rubber, butadiene-styrene copolymers, butadiene-acrylonitrile copolymers, polychloroprene, compatible mixtures thereof or any rubber-like material suitable for the use to which the universal joint is applied.

While the embodiments of the present invention as herein disclosed constitute preferred forms, it is to be understood that other forms might be adopted.

What is claimed is as follows:

1. A universal joint member adapted to be movably and sealingly interposed between rigidly spaced inner and outer partially spherical members having concentric partically spherical surfaces, comprising a partially spherical shell having a plurality of spaced circumferentially disposed openings and a molded integral seal comprising an inner and an outer annulus carried on inner and outer sides of said shell, respectively, in alignment with said openings and a plurality of connecting portions projecting through said opening and joining said annuli said annuli being aligned along a radius of said partially spherical members and said shell.

2. A partially spherical universal joint member adapted to be movably and sealingly interposed between spaced concentric inner and outer partially spherical members, comprising a partially spherical shell having a plurality of spaced circumferentially disposed openings and an elastomeric seal ring molded and bonded to inner and outer sides of said shell in alignment with said openings and being aligned along the radius of said partially spherical shell.

3. In a universal joint including concentric inner and outer spherical members in spaced relation and a third partially spherical member having a plurality of circumferentially spaced openings therein interposed between said inner and outer members in spaced relation and being adapted for oscillatory movement with respect to said inner and outer members, a seal comprising elastomeric rings disposed circumferentially on inner and outer sides of said third member in opposed relation and in alignment with said openings, said rings being mechanically joined by elastomeric seal portions disposed within said openings and being aligned along the radius of said partially spherical shell.

4. A universal joint member adapted to be movably and sealingly interposed between spaced concentric inner and outer partially spherical members, comprising a partically spherical shell having a plurality of spaced circumferentially disposed openings therein and a seal ring having an inner ring portion engaging inner circumferential portions of said shell in alignment with said openings, an outer ring portion engaging outer circumferential portions of said shell in alignment with said openings and radial portions projecting through said openings and integrally joining said inner and outer seal ring portions said ring portions being aligned with a radius of said shell.

5. A universal joint comprising in combination, concentric inner and outer partially spherical members in spaced relation; a third partially spherical member interposed between said inner and outer members in spaced relation and being adapted for oscillatory movement with respect to said members; said third member having a plurality of openings disposed in spaced relation and circumferentially thereof; and elastomeric seal rings molded on inner and outer surfaces of said third member in circumferential alignment with said openings and being bonded to said third member; said seal rings having portions extending through said openings whereby said rings are integrally joined, said seal rings being under compression between said inner and outer members and said third member.

6. A housing adapted to encase a universal joint and follow the oscillatory movement thereof, comprising in combination, a housing section having an annular face on one end thereof; concentric outer and inner partially spherical housing sections in spaced relation secured at enlarged ends to said annular face; a third partially spherical section interposed between said inner and outer sections in spaced relation; said third section having a plurality of openings disposed in spaced relation and circumferentially thereof; elastomeric seal rings molded onto inner and outer surfaces of and in alignment with said openings and being bonded to said third section, said rings being joined by elastomeric portions disposed within said holes, said rings being compressed between said third member and said inner and outer members.

7. An elastomeric seal for use in sealing the space between a pair of rigidly spaced, concentric, facing curvilinear surfaces and a relatively movable concentric curvilinear member having inner and outer curvilinear surfaces, interposed between said curvilinear surfaces in spaced relation, consisting of an integral structure comprising an inner and an outer annulus joined by a plurality of spacing elements, adapted to be carried by said curvilinear member, said inner annulus being shaped to sealingly engage said inner curvilinear surface and said outer annulus being shaped to sealingly engage said outer curvilinear surface, said inner annulus being of a smaller diameter than said outer annulus.

8. An elastomeric seal for use in sealing a universal joint including a pair of concentric, partially spherical surfaces supported in rigidly spaced relation and a relatively movable concentric, partially spherical member having inner and outer partially spherical surfaces interposed between said surfaces in a concentric and spaced relation, consisting of an integral structure comprising an inner and an outer annulus joined by a plurality of separated spacing elements, adapted to be carried by said partially spherical member, said inner annulus being shaped to sealingly engage said inner partially spherical surface, said outer annulus being shaped to sealingly engage said outer partially spherical surface, said inner annulus being of a smaller diameter than said outer annulus, said annuli being aligned along a radius of said partially spherical member.

9. A universal joint comprising in combination, concentric inner and outer partially spherical members in spaced relation; a third partially spherical member interposed between said inner and outer members in spaced relation and being adapted for oscillatory movement with respect to said members; said third member having a plurality of openings disposed in spaced relation and circumferentially thereof; said elastomeric rings having mound shaped cross sections molded on inner and outer surfaces of said third member in circumferential alignment with said openings, the bases of mound shaped rings conforming to the surfaces of the said third member and being bonded thereto; said seal rings having portions extending through said openings whereby said rings are integrally joined; said seal rings being under compression between said inner and outer members and said third member and being capable of rolling on movement of said members.

10. An elastomeric sealing member for sealing the spaces between a partially spherical shell member interposed for relative rotary motion between spaced partially spherical housing members consisting of; an integral elastomeric structure comprising two concentric annuli disposed at opposite sides of said shell member for sealingly engaging respectively the spherical housing members, and a plurality of circumferentially spaced connecting portions extending radially through said shell and associated with said annuli at opposite sides of said shell whereby, as the shell rotates relative to the housing members, the spaces therebetween are sealed by said sealing member.

References Cited in the file of this patent
UNITED STATES PATENTS

| | | |
|---|---|---|
| 1,051,025 | Spicer | Jan. 21, 1913 |
| 1,967,840 | Pearce | July 24, 1934 |
| 2,717,793 | Nenzell | Sept. 13, 1955 |

FOREIGN PATENTS

| | | |
|---|---|---|
| 455,615 | Great Britain | Oct. 26, 1936 |